US010094717B2

(12) United States Patent
Chen et al.

(10) Patent No.: US 10,094,717 B2
(45) Date of Patent: Oct. 9, 2018

(54) THERMAL SENSING DEVICE

(71) Applicant: NATIONAL KAOHSIUNG UNIVERSITY OF APPLIED SCIENCES, Kaohsiung (TW)

(72) Inventors: Chung-Nan Chen, New Taipei (TW); Chih-Chun Chen, Taichung (TW); Chun-Hao Chen, Kaohsiung (TW); Wen-Chie Huang, Hualien County (TW)

(73) Assignee: NATIONAL KAOHSIUNG UNIVERSITY OF APPLIED SCIENCES, Kaohsiung (TW)

( * ) Notice: Subject to any disclaimer, the term of this patent is extended or adjusted under 35 U.S.C. 154(b) by 358 days.

(21) Appl. No.: 14/978,838

(22) Filed: Dec. 22, 2015

(65) Prior Publication Data
US 2017/0176263 A1    Jun. 22, 2017

(51) Int. Cl.
*G01K 7/00* (2006.01)
*G01K 3/00* (2006.01)
*G01K 7/24* (2006.01)

(52) U.S. Cl.
CPC ...................... *G01K 7/24* (2013.01)

(58) Field of Classification Search
USPC .......................... 374/185, 166, 110; 327/512
See application file for complete search history.

(56) References Cited

U.S. PATENT DOCUMENTS

| 3,613,535 | A | * | 10/1971 | Hirabayashi | ............. | G03B 7/24 352/141 |
| 4,278,970 | A | * | 7/1981 | Streczyn | ................... | A61B 5/01 337/298 |
| 4,478,077 | A | * | 10/1984 | Bohrer | ................... | G01F 1/6845 257/419 |
| 8,519,818 | B2 | * | 8/2013 | Chen | ....................... | H01C 7/008 338/13 |
| 8,550,707 | B2 | * | 10/2013 | Rivero | .................... | G01K 5/486 374/110 |
| 2009/0016403 | A1 | * | 1/2009 | Chen | ....................... | G01F 1/6845 374/45 |
| 2010/0277223 | A1 | * | 11/2010 | Mirow | ........................ | G05F 3/08 327/513 |
| 2017/0191868 | A1 | * | 7/2017 | Kurth | ...................... | G01J 1/0252 |
| 2017/0268951 | A1 | * | 9/2017 | Chen | ........................ | G01L 21/12 |

* cited by examiner

Primary Examiner — Mirellys Jagan
(74) Attorney, Agent, or Firm — Birch, Stewart, Kolasch & Birch, LLP

(57) ABSTRACT

A thermal sensing device comprises a substrate, a first insulating layer, at least one first sensing resistor, at least one second sensing resistor, a plurality of etching holes and a cavity. The first insulating layer is disposed on the substrate. The first sensing resistor is disposed above the first insulating layer. The second sensing resistor is disposed above the first insulating layer and isolated from the at least one first sensing resistor. The etching holes are disposed around the at least one first sensing resistor and the at least one second sensing resistor. The cavity is formed below the at least one first sensing resistor and the at least one second sensing resistor. The thermal sensing device is implemented in a measurement circuit to improve the problem that the signal becomes smaller when the sensing element is minimized.

11 Claims, 20 Drawing Sheets

THERMAL SENSING DEVICE

BACKGROUND OF THE INVENTION

1. Field of the Invention

The present invention relates to a sensing device, and more particularly relates to a thermal sensing device able to enhance sensing signal output from a measurement circuit.

2. Description of Related Art

A sensing mechanism of a thermal sensing device is that the sensing materials of the thermal sensing device will change material characteristics because of temperature. Therefore, a measurement circuit is used to convert a variation value of the material characteristics of the sensing materials to a signal output. A manufacturing method of the thermal sensing device is to dispose a sensing resistor with temperature coefficient of resistance on a suspending structure made by a semiconducting material with good insulation effect. When current passes through the sensing resistor on the suspending structure, the temperature of the sensing resistor is higher than room temperature because heat is hard to dissipate away. The temperature of the sensing resistor will be varied in accordance with physical variation so as to change the resistant value of the sensing resistor.

With reference to FIG. 12, the conventional thermal sensing device 120 includes a substrate 121, an insulating layer 122, a sensing resistor 123 and a cavity 124. The insulating layer 122 is disposed on a surface of the substrate 121 and the sensing resistor 123 is disposed on the insulating layer 122. The cavity 124 is formed by hollowing an internal space of the substrate 121 of the thermal sensing device 120, and the insulating layer 122 and the sensing resistor 123 form a suspending structure 125 above the cavity 124. Since the suspending structure 125 is connected to the insulating layer 122 on the substrate 121 via a connecting portion 126 of the suspending structure 125, a thermal conductive effect between the sensing resistor 123 and the substrate 121 is reduced. Therefore, the heat generated by the sensing resistor 123 transmitting to the substrate 121 is reduced to improve the sensing effect.

With reference to FIG. 13, the thermal sensing device is usually implemented in a Wheatstone Bridge circuit 130 composed of four resistors to perform a measurement. The Wheatstone Bridge circuit 130 includes a first resistor 131, a second resistor 132, a third resistor and a fourth resistor 134. The resistant value of the sensing element is varied in accordance with the temperature, so a variation of a voltage difference at middle of the Wheatstone Bridge circuit 130 is used to measure physical quantities. As shown in FIG. 13, in the Wheatstone Bridge circuit 130, the thermal sensing device is implemented to be the third resistor 133, but the first resistor 131, the second resistor 132 and the fourth resistor 134 are normal resistors that will not be varied in accordance with the temperature. The resistant values of the first resistor 131, the second resistor 132, the third resistor 133 and the fourth resistor 134 are $R_1$, $R_2$, $R_3(T)$ and $R_4$ respectively. Equations of the Wheatstone Bridge circuit 130 are:

$$\Delta Vs = V34 - V12, \quad V12 = Vb\left[\frac{R_2}{R_1 + R_2}\right], \quad V34 = Vb\left[\frac{R_4}{R_3(T) + R_4}\right]$$

V12 is a voltage value at a node between the first resistor 131 and the second resistor 132 and V34 is a voltage value at a node between the third resistor 133 and the fourth resistor 134. Vb is an operating voltage of the Wheatstone Bridge circuit 130. If the third resistor 133 includes positive temperature coefficient of resistance (PTCR), the resistant value $R_3(T)$ of the third resistor 133 is proportional to the temperature. When the detected physical value is changed, for example a thermal conductance of the sensing element is increased when air pressure is raised, the temperature of the sensing element is decreased and the resistant value $R_3(T)$ of the third resistor 133 is reduced. Therefore, the V34 voltage is increased. Since the V12 voltage is irrelevant to the temperature, a variation value Vs of the output voltage is increased and a value of the detected physical value can be calculated in accordance with the variation value Vs of the output voltage.

With advances in Micro Electromechanical System (MEMS) technology, the size of the sensing element is getting smaller and smaller, so a sensing signal calculated in accordance with the resistant variation of the sensing resistor 123 is not high enough. If the detected sensing signal can be increased, the problem that the signal becomes weaker because of a miniaturization process of the sensing element can be resolved. Therefore, a need arises to design a thermal sensing device to increase the sensing signal outputted from the measurement circuit so as to resolve the aforementioned problem.

SUMMARY OF THE INVENTION

An objective of the present invention is to provide a thermal sensing device and the thermal sensing device can enhance sensing signal outputted by the measurement circuit. The problem that the signal becomes smaller when the sensing element is minimized may be resolved.

According to the aforementioned objective, a thermal sensing device provided in the present invention comprises:

a substrate;

a first insulating layer disposed on the substrate;

at least one first sensing resistor disposed above the first insulating layer;

at least one second sensing resistor disposed above the first insulating layer and isolated from the at least one first sensing resistor;

a plurality of etching holes disposed around the at least one first sensing resistor and the at least one second sensing resistor;

a cavity formed below the at least one first sensing resistor and the at least one second sensing resistor;

wherein the thermal sensing device is implemented in a measurement circuit, the measurement circuit includes a first resistor, a second resistor, a third resistor and a fourth resistor, and the at least one first sensing resistor and the at least one second sensing resistor are respectively implemented to be at least two of the first resistor, the second resistor, the third resistor and the fourth resistor of the measurement circuit.

By increasing the number of the sensing resistors in one thermal sensing device and adapting to the installation locations of the resistors in the Wheatstone Bridge circuit, the sensing signal is significantly increased so as to resolve the problem that the signal becomes smaller when the sensing element is minimized.

DETAILED DESCRIPTION OF THE PREFERRED EMBODIMENT

These and other aspects of the embodiments herein will be better appreciated and understood when considered in conjunction with the following description and the accompanying drawings.

Figure 1A:
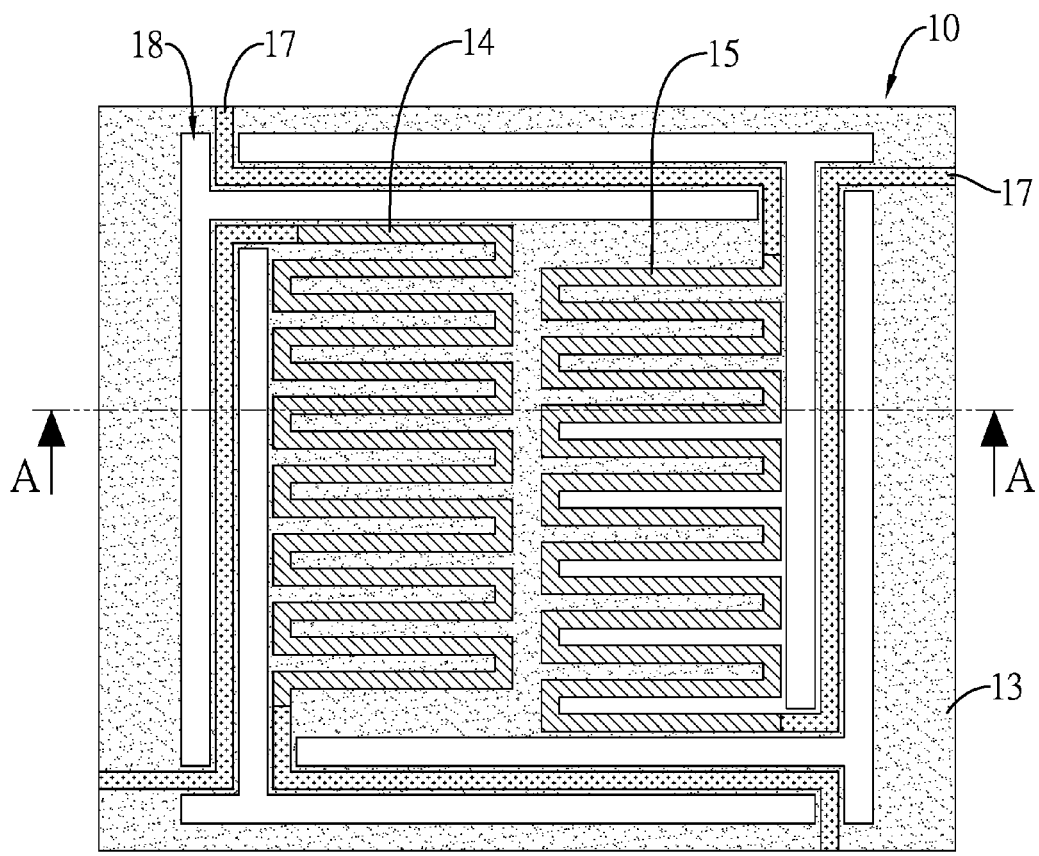
FIG. 1A is a schematic view of a thermal sensing device in a first embodiment of the present invention.
Figure 1B:
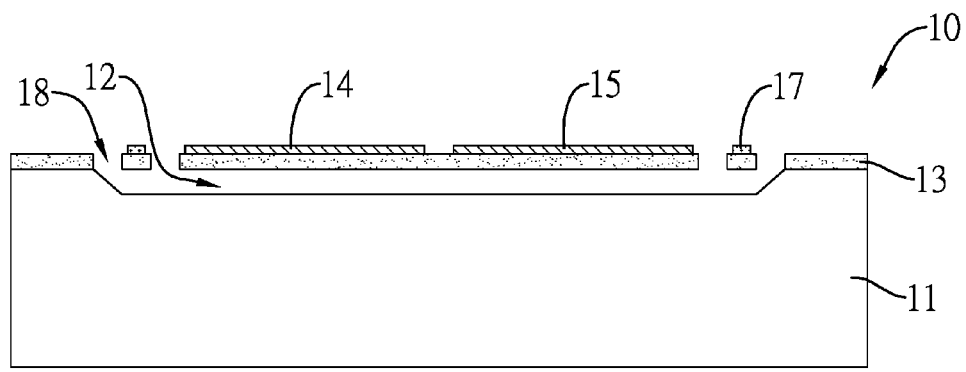
FIG. 1B is an A-A sectional view of FIG. 1A.

FIG. 1A is a schematic view of a thermal sensing device in a first embodiment of the present invention. FIG. 1B is an A-A sectional view of FIG. 1A. As shown in FIG. 1A and FIG. 1B, the thermal sensing device 10 includes a substrate 11, a cavity 12, a first insulating layer 13, at least one first sensing resistor 14, at least one second sensing resistor 15, a plurality of electrical connecting wires 17 and a plurality of etching holes 18.

Figure 1C:
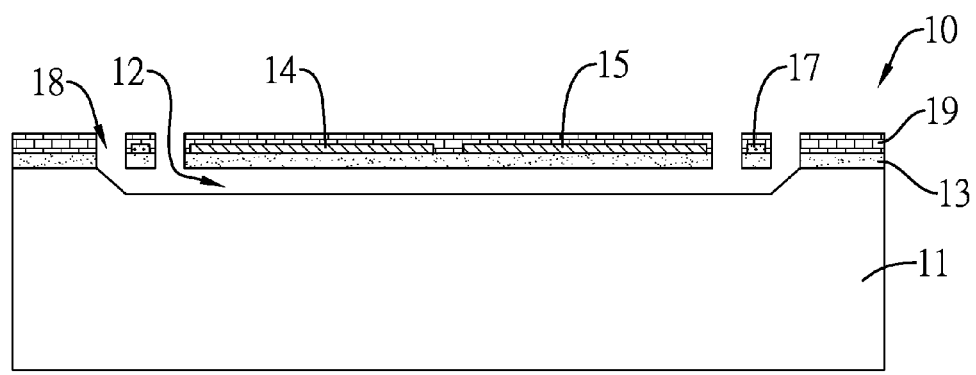
FIG. 1C and FIG. 1D are sectional views of the thermal sensing device different from the thermal sensing device in FIG. 1B.
Figure 1D:
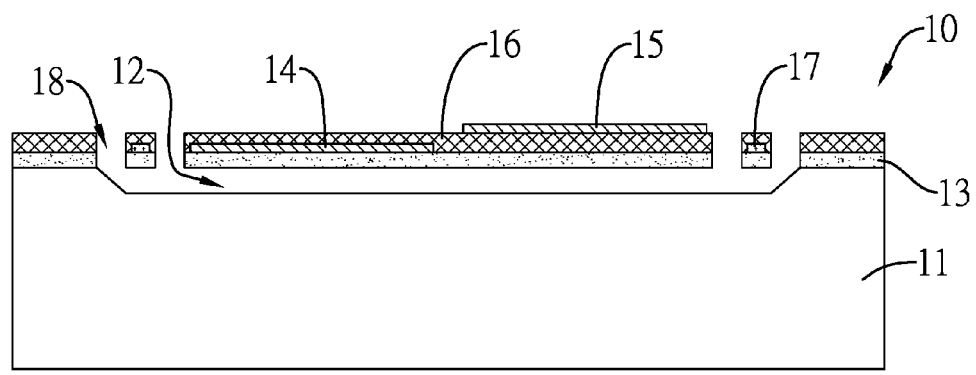

The first insulating layer 13 is disposed on the substrate 11. The first sensing resistor 14 and the second sensing resistor 15 are resistors with PTCR, and the first sensing resistor 14 and the second sensing resistor 15 are separated from each other. In addition, the electrical connecting wires 17 are disposed around the first sensing resistor 14 and the second sensing resistor 15. Each of the electrical connecting wires 17 is electrically connected to the first sensing resistor 14 or the second sensing resistor 15, and the electrical connecting wires 17 are implemented to connect the first sensing resistor 14 and the second sensing resistor 15 with an external circuit. Since the first sensing resistor 14 and the second sensing resistor 15 are resistors having PTCR, materials used in the first sensing resistor 14 and the second sensing resistor 15 may be the same, and the material of the electrical connecting wire 17 may be the same as the first sensing resistor 14 and the second sensing resistor 15. In a different embodiment of the present invention, as shown in FIG. 1C, a second insulating layer 19 is further disposed on the first insulating layer 13, the first sensing resistor 14, the second sensing resistor 15 and the electrical connecting wires 17. The second insulating layer covers the first insulating layer 13, the first sensing resistor 14, the second sensing resistor 15 and the electrical connecting wires 17. Moreover, in a different embodiment, as shown in FIG. 1C, the thermal sensing device further includes a third insulating layer 16. The third insulating layer 16 covers the first sensing resistor 14 and a portion of the first insulating layer 13, and the second sensing resistor 15 is disposed on the third insulating layer 16 to prevent an electrical contact between the first sensing resistor 14 and the second sensing resistor 15, as shown in FIG. 1D. The etching holes 18 are disposed at two sides of the electrical connecting wires 17, and the cavity 12 is formed in the substrate 11 below the first sensing resistor 14 and the second sensing resistor 15. By the aforementioned structure, a portion of the first insulating layer 13, the first sensing resistor 14, the second sensing resistor 15 and a portion of the second insulating layer 19 form a suspending structure 18 to minimize a thermal conductive path from the first sensing resistor 14 and the second sensing resistor 15 to the substrate 11.

The forming method of the first sensing resistor 14, the second sensing resistor 15 and the electrical connecting wires 17 in the present invention is to deposit a material layer and etch the material layer to form the first sensing resistor 14, the second sensing resistor 15 and the electrical connecting wire 17 respectively. In addition, the first insulating layer 13 is further etched to form the etching holes 18, and the cavity 12 is formed by etching the substrate 11 from the position of the etching holes 18. By the aforementioned manufacturing method, the formation of the first sensing resistor 14 and the second sensing resistor 15 on the substrate 11 is finished. In addition, in the present embodiment, a shape of the first sensing resistor 14 and a shape of the second sensing resistor 15 are continuously curved lines. However, in a different embodiment, the shape of the first sensing resistor and the shape of the second sensing resistor may be different, such as a flat shape, and it is not limited herein.

Figure 2A:
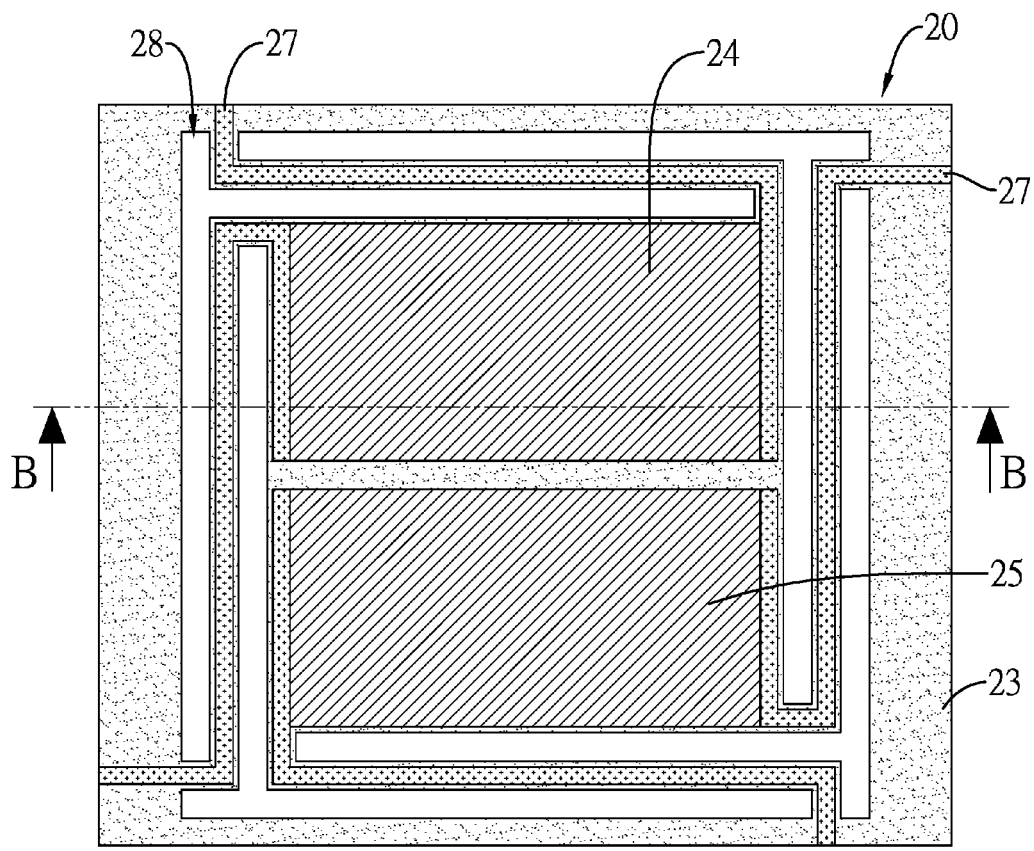
FIG. 2A is a schematic view of the thermal sensing device in a second embodiment of the present invention.
Figure 2B:
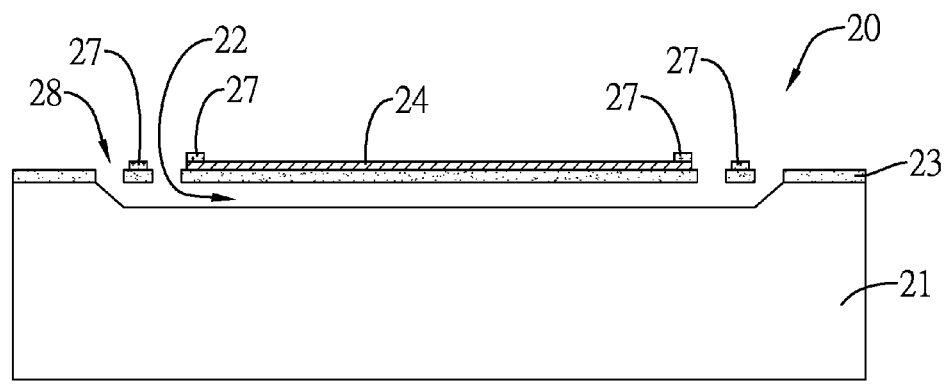
FIG. 2B is a B-B sectional view of FIG. 2A

FIG. 2A is a schematic view of the thermal sensing device in a second embodiment of the present invention. FIG. 2B is a B-B sectional view of FIG. 2A. As shown in FIG. 2A and FIG. 2B, the thermal sensing device 20 includes a substrate 21, a cavity 22, a first insulating layer 23, at least one first sensing resistor 24, at least one second sensing resistor 25, a plurality of electrical connecting wires 27 and a plurality of etching holes 28.

Figure 2C:
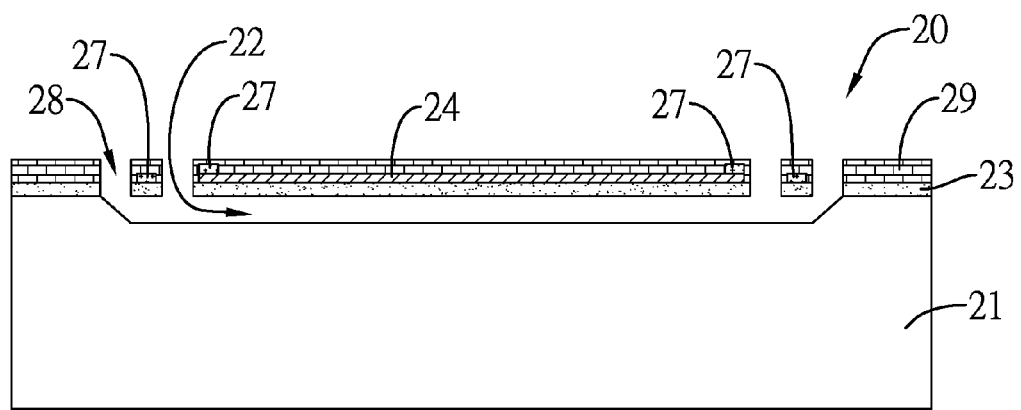
FIG. 2C is a sectional view of the thermal sensing device different from the thermal sensing device in FIG. 2B.

The first insulating layer 23 is disposed on the substrate 21. The first sensing resistor 24 and the second sensing resistor 25 are resistors with negative temperature coefficient of resistance (NTCR), and the first sensing resistor 24 and the second sensing resistor 25 are separated from each other. The installation method and the installation positions of the rest components (such as the electrical connecting wires 27, the etching holes 28, the cavity 22 and so on) are the same as the first embodiment, and the description thereof is omitted herein. In a different embodiment of the present invention, as shown in FIG. 2C, the second insulating layer 29 is also disposed on the first insulating layer 23, the first sensing resistor 24, the second sensing resistor 25 and the electrical connecting wires 27, and the second insulating layer 29 covers the first insulating layer 23, the first sensing resistor 24, the second sensing resistor 25 and the electrical connecting wires 27. The cavity 22 below the first sensing resistor 24 and the second sensing resistor 25 is also implemented to minimize a thermal conductive path from the first sensing resistor 24 and the second sensing resistor 25 to the substrate 21. In addition, in the present embodiment, the shape of the first sensing resistor 24 and the second sensing resistor 25 are plane, but, in a different embodiment, the shape of the first sensing resistor 24 and the second sensing resistor 25 may be different, such as curve shape, and it is not limited herein.

Figure 3A:
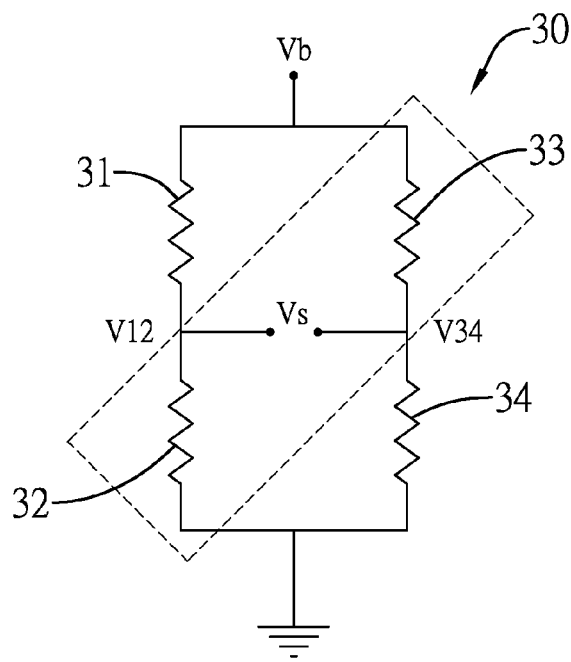
FIG. 3A and FIG. 3B are measurement circuit diagrams implemented in the thermal sensing device in the first embodiment in FIG. 1A and FIG. 1B.

FIG. 3A is a measurement circuit diagram implemented in the thermal sensing device in the first embodiment in FIG. 1A and FIG. 1B. As shown in FIG. 3A, the measurement circuit 30 is preferred to be a Wheatstone Bridge circuit and includes a first resistor 31, a second resistor 32, a third resistor 33 and a fourth resistor 34. The first sensing resistor 14 and the second sensing resistor 15 with PTCR shown in FIG. 1A and FIG. 1B are implemented in the second resistor 32 and the third resistor 33 of the measurement circuit 30. The first resistor 31 and the second resistor 32 (the first sensing resistor 14) are connected in series between a voltage difference of an operating voltage Vb and a ground point. The third resistor 33 (the second sensing resistor 15) and the fourth resistor 34 are connected in series between the voltage difference of the operating voltage and the ground point and further connected in parallel with the first resistor 31 and the second resistor 32. Equations of the Wheatstone Bridge circuit as the measurement circuit 30 are:

$$Vs = V34 - V12, V12 = Vb\left[\frac{R_2(T)}{R_1 + R_2(T)}\right], V34 = Vb\left[\frac{R_4}{R_3(T) + R_4}\right]$$

Resistant values of the first resistor 31, the second resistor 32, the third resistor 33 and the fourth resistor 34 are $R_1$, $R_2(T)$, $R_3(T)$ and $R_4$ respectively. Vs is a signal variation value of the measurement circuit. V12 is a node voltage between the first resistor 31 and the second resistor 32 and V34 is the node voltage between the third resistor 33 and the fourth resistor 34. Since both of the second resistor 32 and the third resistor 33 include PTCR, the resistant values of the second resistor 32 and the third resistor 33 become smaller as temperature drops when pressure is increased. The voltage value of the node voltage V34 between the third resistor 33 and the fourth resistor 34 is decreased and the voltage value of the node voltage V12 between the first resistor 31 and the second resistor 32 is decreased. Therefore, the signal variation value Vs of the measurement circuit is substantially increased. Moreover, when the second resistor 32 and the third resistor 33 are the first sensing resistor 14 and the second sensing resistor 15 with NTCR, the signal variation value is a negative value and the effect to increase the signal variation value of the measurement circuit is the same.

Figure 3B:
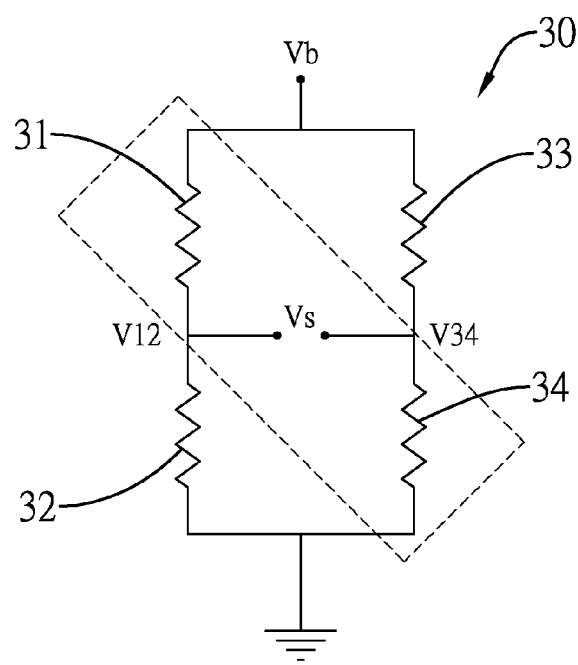

In the second embodiment, with reference to FIG. 2A, FIG. 2B and FIG. 3B, the first sensing resistor 24 and the second sensing resistor 25 with PTCR are implemented to be the first resistor 31 and the fourth resistor 34 of the measurement circuit 30. The first resistor 31 (the first sensing resistor 14) and the second resistor 32 are connected in series between the voltage difference of the operating voltage Vb and the ground point. The third resistor 33 and the fourth resistor 34 (the second sensing resistor 15) are connected in series between the voltage difference of the operating voltage Vb and the ground point and further connected in parallel with the first resistor 31 and the second resistor 32. Since the first sensing resistor 24 (the first resistor 31) and the second sensing resistor 25 (the fourth resistor 34) include PTCR, the resistance value R1(T) and the R4(T) of the first resistor 33 and the fourth resistor 34 become smaller as the temperature drops when the pressure is increased. The voltage value of the node voltage V34 between the third resistor 33 and the fourth resistor 34 are increased and the voltage value of the node voltage V12 between the first resistor 31 and the second resistor 32 are decreased. Therefore, the signal variation value Vs also has an increasing effect.

Figure 4A:
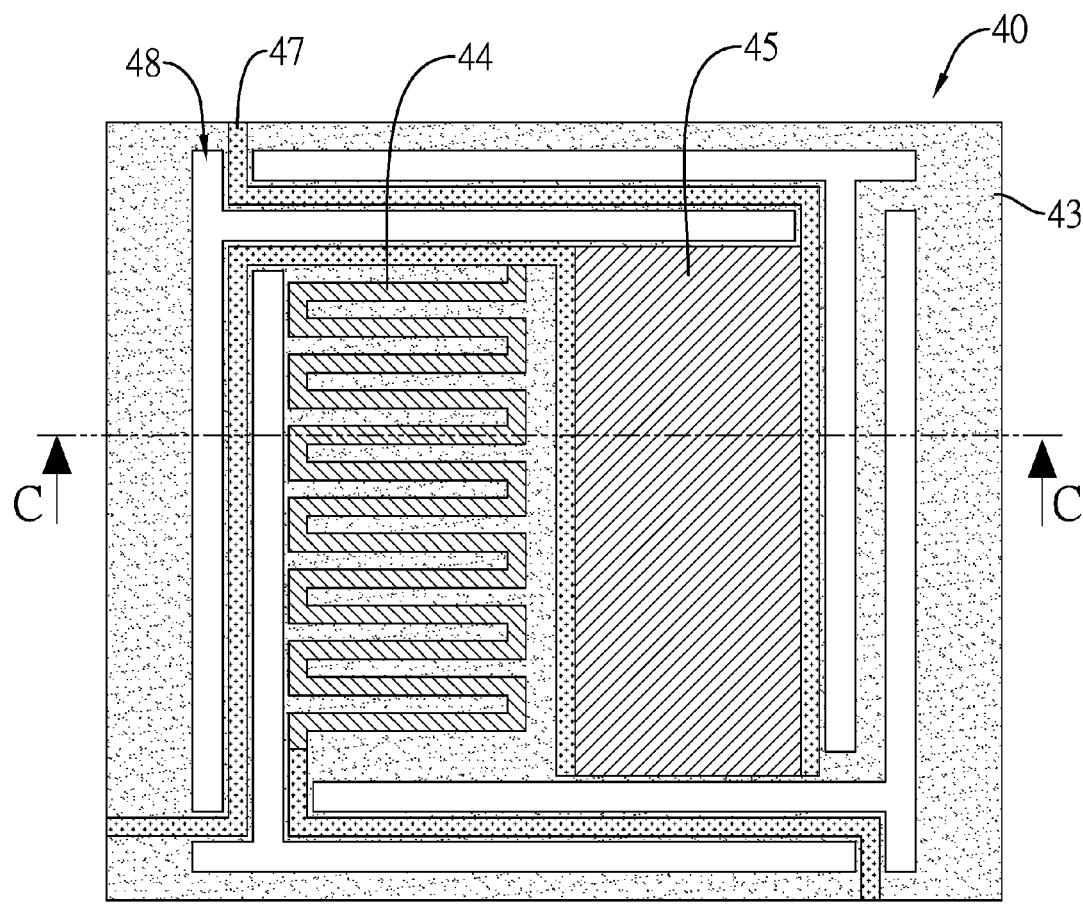
FIG. 4A is a schematic view of the thermal sensing device in a third embodiment of the present invention.
Figure 4B:
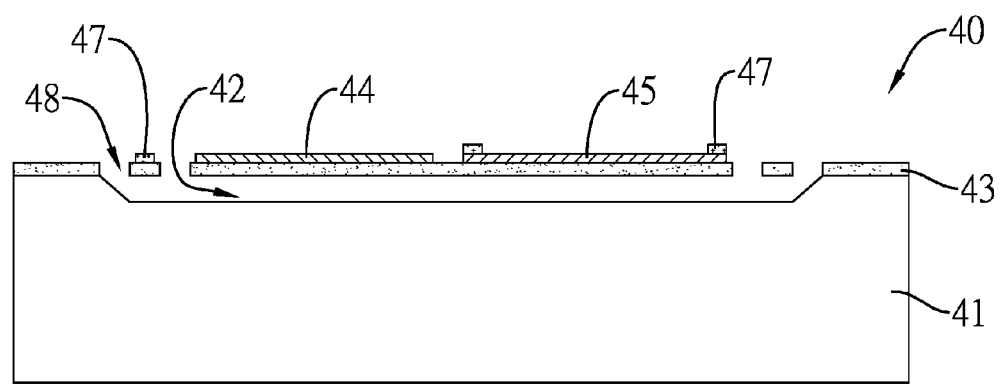
FIG. 4B is a C-C sectional view of FIG. 4A

FIG. 4A is a schematic view of the thermal sensing device in a third embodiment of the present invention. FIG. 4B is a C-C sectional view of FIG. 4A. As shown in FIG. 4A and FIG. 4B, the thermal sensing device 40 includes a substrate 41, a cavity 42, a first insulating layer 43, at least one first sensing resistor 44, at least one second sensing resistor 45, a plurality of electrical connecting wires 47 and a plurality of etching holes 48.

Figure 4C:
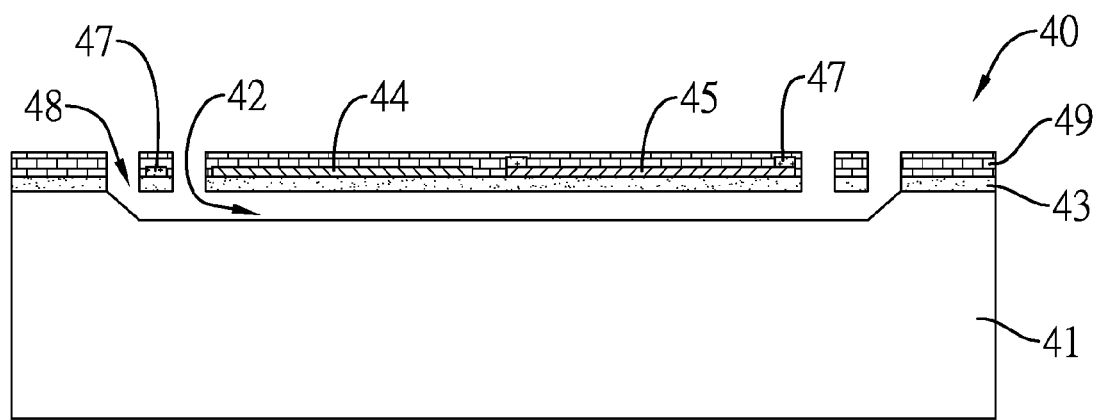
FIG. 4C is a sectional view of the thermal sensing device different from the thermal sensing device in FIG. 4B.

The first insulating layer 43 is disposed on the substrate 41. The first sensing resistor 44 and the second sensing resistor 45 are disposed on a surface of the first insulating layer 43. The first sensing resistor 44 and the second sensing resistor 45 are separated from each other. The first sensing resistor 44 and the second sensing resistor 45 are the resistor with PTCR and the resistor with NTCR respectively. However, in a different embodiment, the first sensing resistor 44 and the second sensing resistor 45 may be the resistor with NTCR and the resistor with PTCR respectively and it is not limited herein. The electrical connecting wires 47 are disposed around the first insulating layer 43 and on a top of the second sensing resistor 45. In a different embodiment, the thermal sensing device 40 further includes a second insulating layer 49 and the second insulating layer 49 covers the top of the first insulating layer 43, the first sensing resistor 44, the second sensing resistor 45 and the electrical connecting wires 47, as shown in FIG. 4C. The installation method and the installation positions of the rest components (such as the etching holes 48, the cavity 42 and so on) are the same as the first embodiment, and the description thereof is omitted herein. The cavity 42 below the first sensing resistor 44 and the second sensing resistor 45 is also implemented to minimize a thermal conductive path from the first sensing resistor 44 and the second sensing resistor 45 to the substrate 41.

Figure 5A:
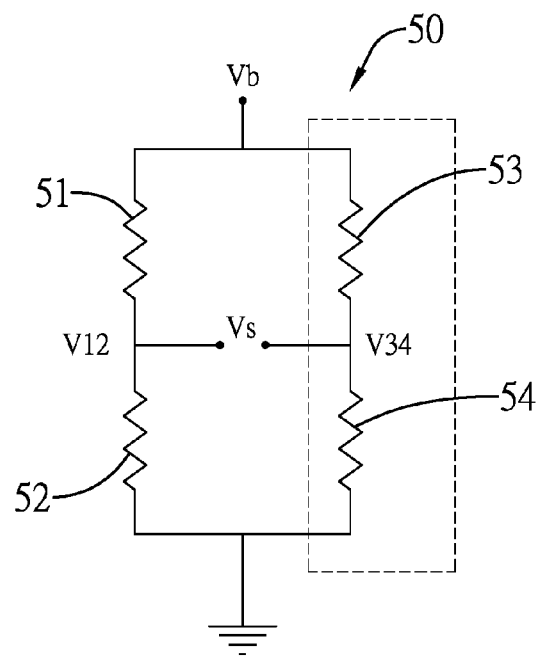
FIG. 5A-FIG. 5D are measurement circuit diagrams implemented in the thermal sensing device in the third embodiment in FIG. 4A and FIG. 4B.

FIG. 5A-FIG. 5D are circuit diagrams of the measurement circuits implemented in the thermal sensing device in the third embodiment in FIG. 4A and FIG. 4B. As shown in FIG. 5A, the measurement circuit 50 is also a Wheatstone Bridge circuit and includes a first resistor 51, a second resistor 52, a third resistor 53 and a fourth resistor 54.

The first resistor 51 and the second resistor 52 are connected in series between the voltage difference of an operating voltage Vb and a ground point. The third resistor 53 and the fourth resistor 54 are connected in series between the voltage difference of the operating voltage and the ground point and further connected in parallel with the first resistor 51 and the second resistor 52. Equations of the Wheatstone Bridge circuit as the measurement circuit 50 are:

$$Vs = V34 - V12, V12 = Vb\left[\frac{R_2}{R_1 + R_2}\right], V34 = Vb\left[\frac{R_4(T)}{R_3(T) + R_4(T)}\right]$$

Resistant values of the first resistor 51, the second resistor 52, the third resistor 53 and the fourth resistor 54 are $R_1$, $R_2$, $R_3(T)$ and $R_4(T)$ respectively. The third resistor 53 and the fourth resistor 54 respectively include PTCR and NTCR. The resistant value of the third resistor 53 becomes smaller as the temperature drops when the pressure is increased. The voltage value of the node voltage V34 between the third resistor 53 and the fourth resistor 54 is increased. Therefore, the signal variation value Vs of the measurement circuit is substantially increased.

Figure 5B:
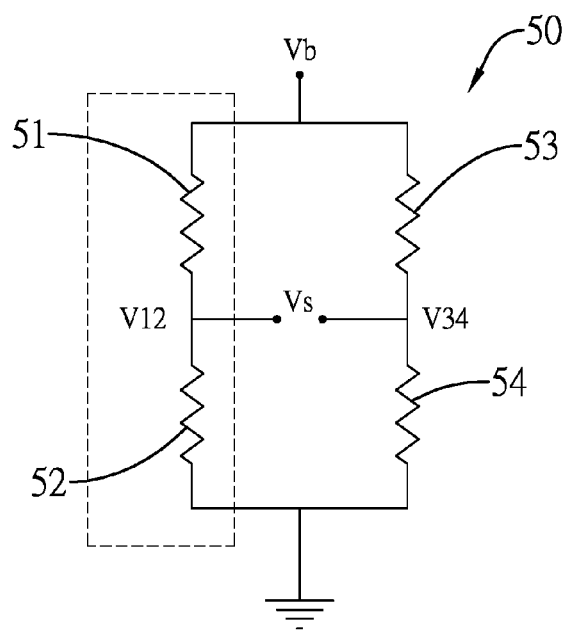
Figure 5C:
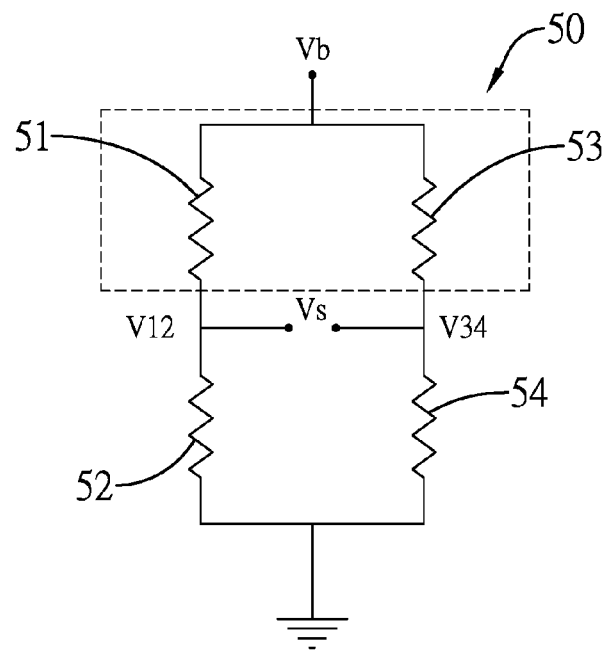
Figure 5D:
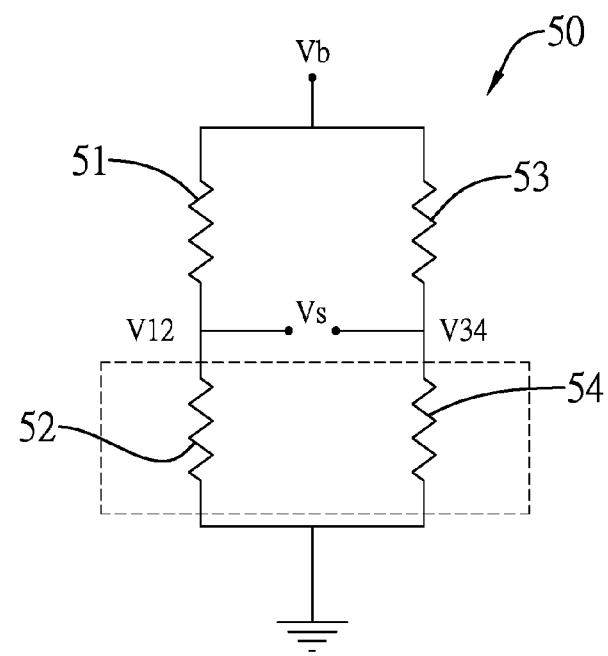

In addition, in a different embodiment, a different circuit structure in the measurement circuit 50 can achieve the purpose of increasing the signal variation value Vs of the measurement circuit 50, as shown in FIG. 5B-FIG. 5D. With reference to FIG. 5B, the first sensing resistor 44 and the second sensing resistor 45 at the thermal sensing device of the present invention in FIG. 4A and FIG. 4B are implemented to be the first resistor 51 and the second resistor 52. The first resistor 51 and the second resistor 52 respectively include NTCR and PTCR. With reference to FIG. 5C, the first sensing resistor 44 and the second sensing resistor 45 at the thermal sensing device of the present invention in FIG. 4A and FIG. 4B are implemented to be the first resistor 51 and the third resistor 53. The first resistor 51 and the third resistor 53 respectively include NTCR and PTCR. With reference to FIG. 5D, the first sensing resistor 44 and the second sensing resistor 45 at the thermal sensing device of the present invention in FIG. 4A and FIG. 4B are implemented to be the second resistor 52 and the fourth resistor 54. The second resistor 52 and the fourth resistor 54 respectively include PTCR and NTCR.

Figure 6A:
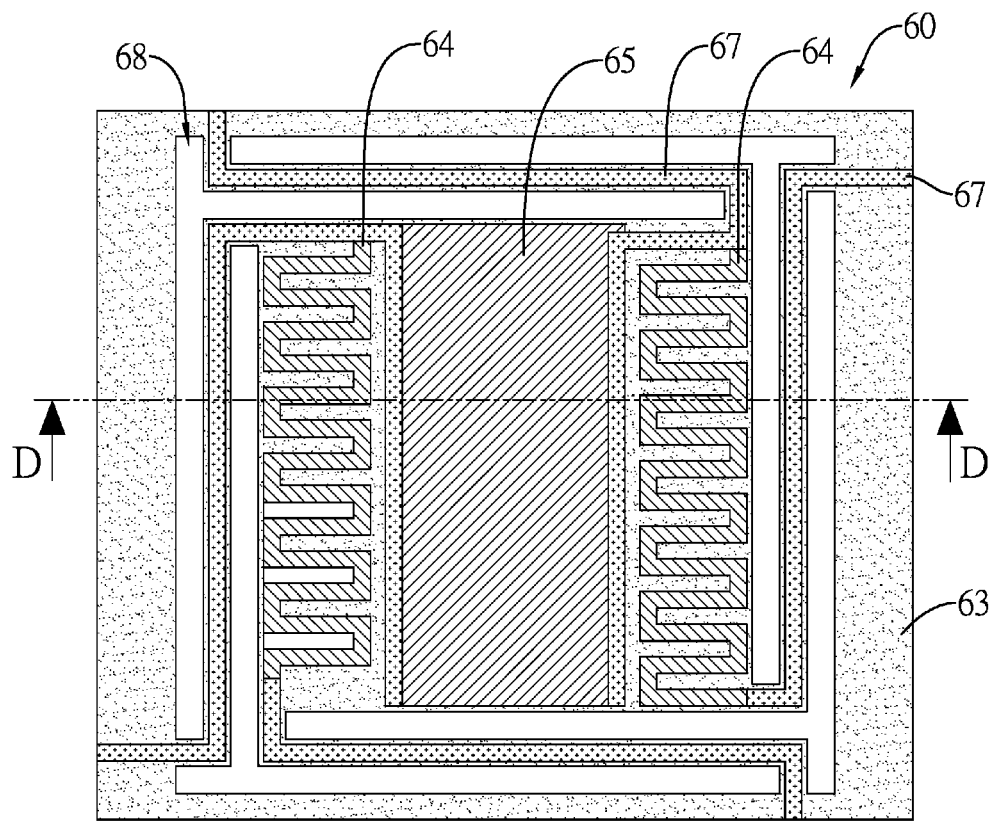
FIG. 6A is a schematic view of the thermal sensing device in a fourth embodiment of the present invention.
Figure 6B:
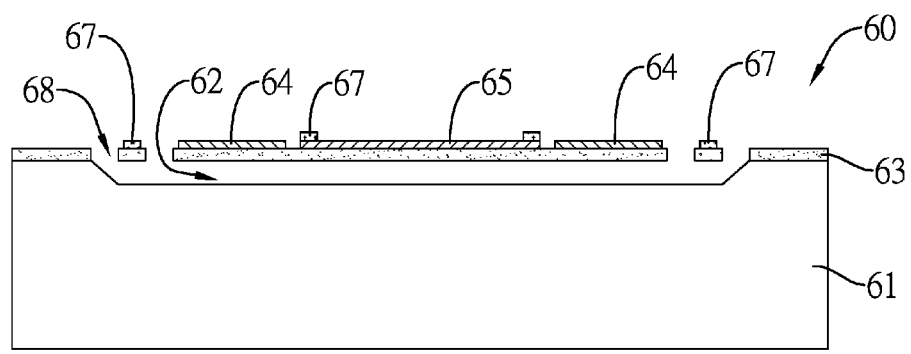
FIG. 6B is a D-D sectional view of FIG. 6A
Figure 6C:
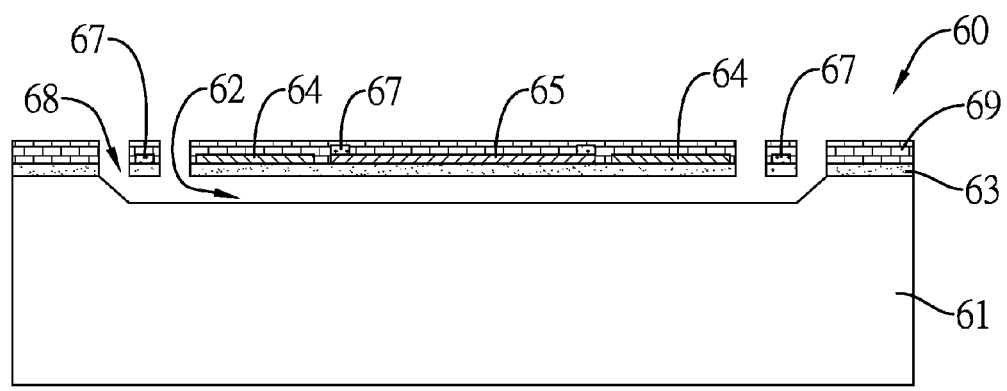
FIG. 6C is a sectional view of the thermal sensing device different from the thermal sensing device in FIG. 6B.

FIG. 6A is a schematic view of the thermal sensing device in the fourth embodiment of the present invention. FIG. 6B is a D-D sectional view of FIG. 6A. As shown in FIG. 6A and FIG. 6B, the thermal sensing device 60 includes a substrate 61, a cavity 62, a first insulating layer 63, two first sensing resistors 64, a second sensing resistor 65, a plurality of electrical connecting wires 67 and a plurality of etching holes 68.

The first insulating layer 63 is disposed on the substrate 61. The first sensing resistor 64 and the second sensing resistor 65 are the resistor with PTCR and the resistor with NTCR respectively. However, in a different embodiment, the first sensing resistor 64 and the second sensing resistor 65 are the resistor with NTCR and the resistor with PTCR respectively, but it is not limited herein. The first sensing resistors 64 and the second sensing resistor 65 are disposed on the surface of the first insulating layer 63. The first sensing resistors 64 and the second sensing resistor 65 are separated from each other, and the second sensing resistor 65 is disposed between the two first sensing resistors 64. The electrical connecting wires 67 are disposed at the peripheral on the surface of the first insulating layer and on the second sensing resistor 65. In a different embodiment, the thermal sensing device also includes a second insulating layer 69 and the second insulating layer 69 covers the top of the first insulating layer 63, the first sensing resistor 64, the second sensing resistor 65 and the electrical connecting wires 67. The installation method and the installation positions of the rest components (such as the etching holes 68, the cavity 62 and so on) are the same as the aforementioned embodiments, and the description thereof is omitted herein. The cavity 62 below the first sensing resistor 64 and the second sensing resistor 65 is also implemented to minimize a thermal conductive path from the first sensing resistor 64 and the second sensing resistor 65 to the substrate 61.

Figure 7A:
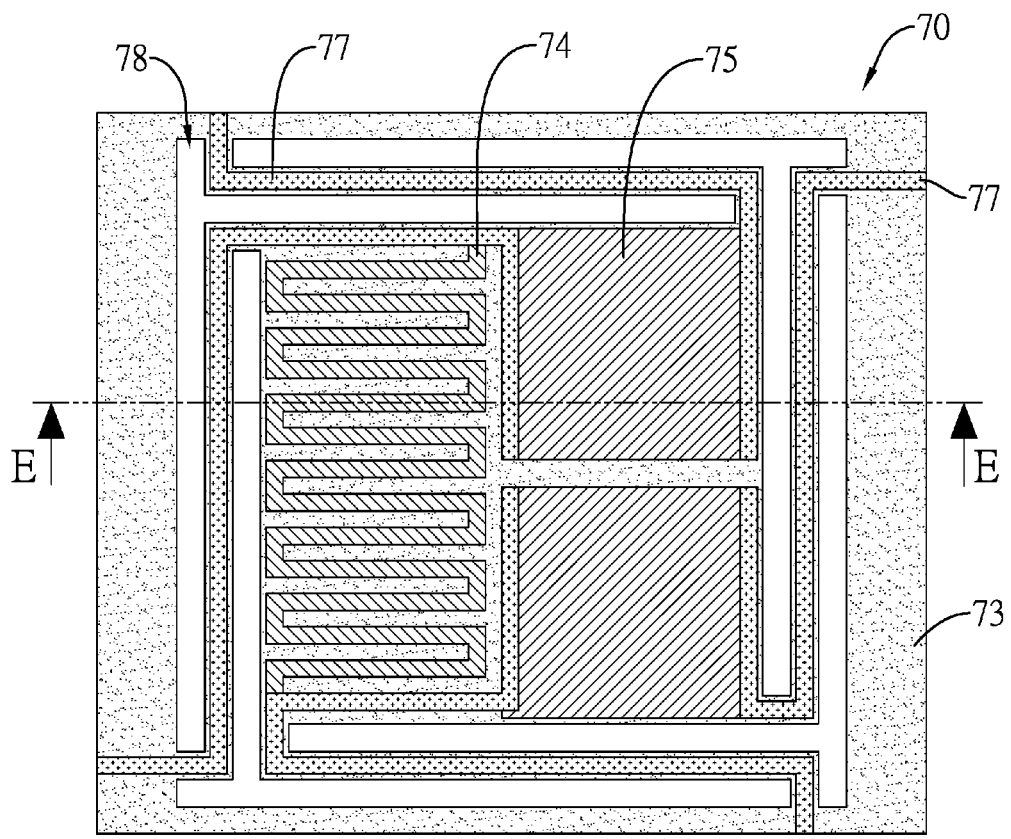
FIG. 7A is a schematic view of the thermal sensing device in a fifth embodiment of the present invention.
Figure 7B:
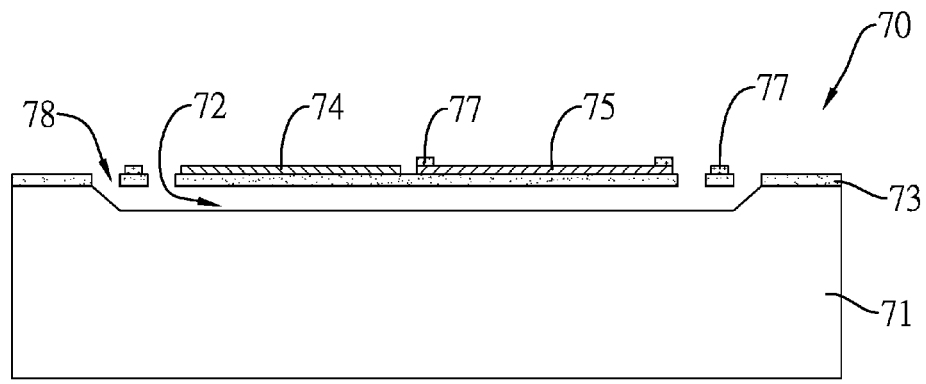
FIG. 7B is an E-E sectional view of FIG. 7A

FIG. 7A is a schematic view of the thermal sensing device in the fifth embodiment of the present invention. FIG. 7B is an E-E sectional view of FIG. 7A. As shown in FIG. 7A and FIG. 7B, the thermal sensing device 70 includes a substrate 71, a cavity 72, a first insulating layer 73, two first sensing resistors 74, a second sensing resistor 75, a plurality of electrical connecting wires 77 and a plurality of etching holes 78.

Figure 7C:
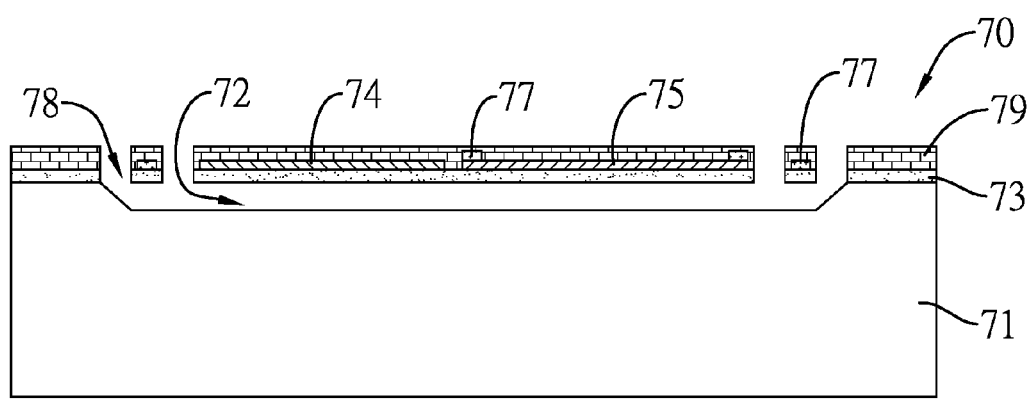
FIG. 7C is a sectional view of the thermal sensing device different from the thermal sensing device in FIG. 7B.

The first insulating layer 73 is disposed on the substrate 71. The first sensing resistor 74 and the second sensing resistor 75 are disposed on the surface of the first insulating layer 73. The first sensing resistor 74 and the second sensing resistor 75 are separated from each other. The first sensing resistor 74 and the second sensing resistor 75 are the resistor with PTCR and the resistor with NTCR respectively. However, in a different embodiment, the first sensing resistor 74 and the second sensing resistor 75 are the resistor with NTCR and the resistor with PTCR respectively, but it is not limited herein. The electrical connecting wires 77 are disposed at the peripheral on the surface of the first insulating layer and on the second sensing resistor 75. In a different embodiment, the thermal sensing device also includes a second insulating layer 79 and the second insulating layer 79 covers the top of the first insulating layer 73, the first sensing resistor 74, the second sensing resistor 75 and the electrical connecting wires 77, as shown in FIG. 7C. The installation method and the installation positions of the rest components (such as the etching holes 78, the cavity 72 and so on) are the same as the aforementioned embodiments, and the description thereof is omitted herein. The cavity 72 below the first sensing resistor 74 and the second sensing resistor 75 is also implemented to minimize a thermal conductive path from the first sensing resistor 74 and the second sensing resistor 75 to the substrate 71.

Figure 8A:
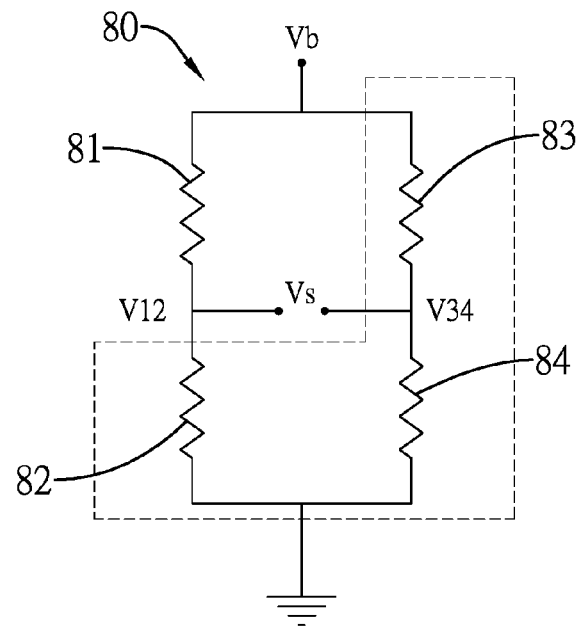
FIG. 8A-FIG. 8D are measurement circuit diagrams implemented in the thermal sensing device in FIG. 6A or FIG. 7A.
Figure 8B:
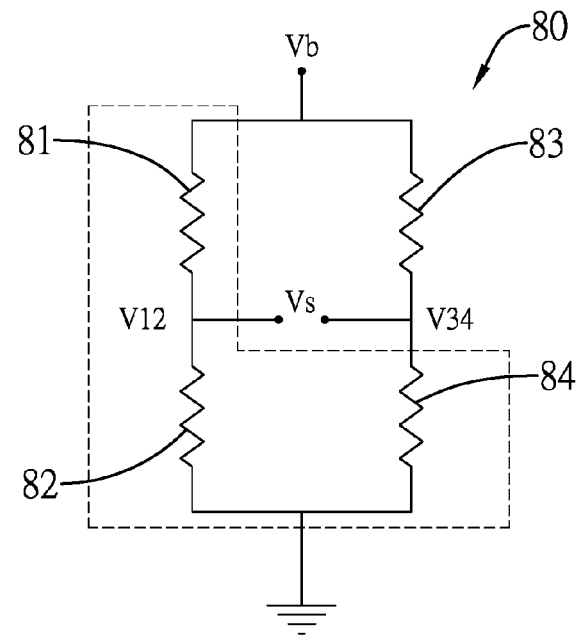
Figure 8C:
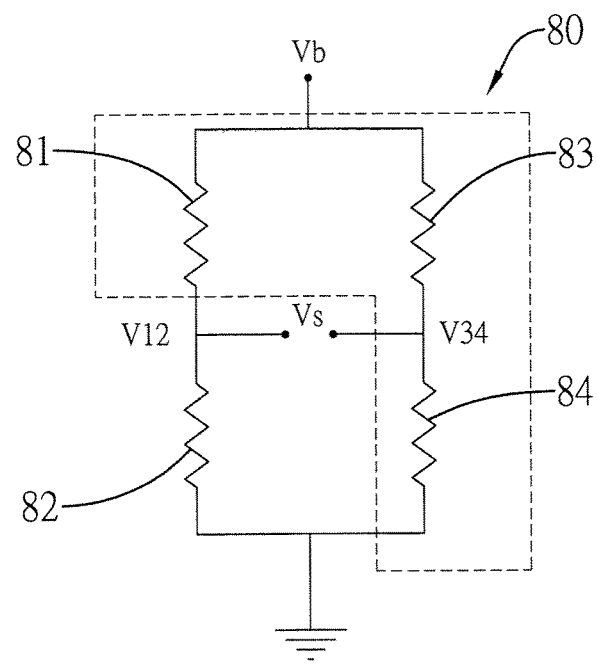
Figure 8D:
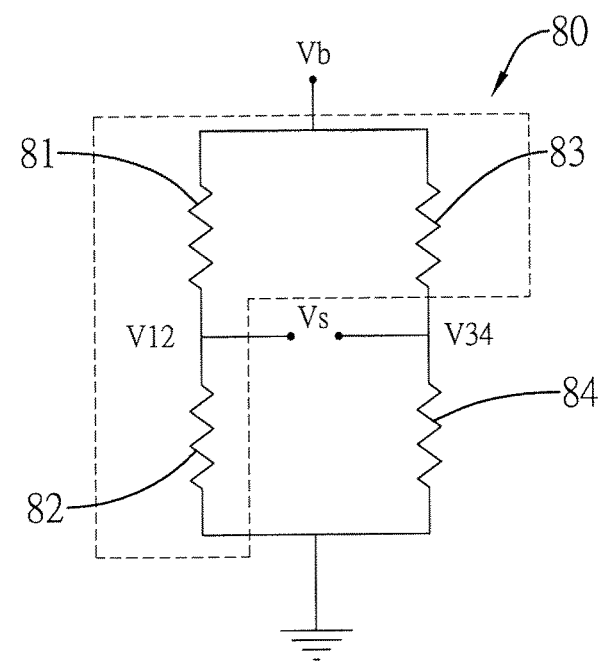

FIG. 8A and FIG. 8D are circuit diagrams of the measurement circuits implementing the thermal sensing device in FIG. 6A or FIG. 7A. As shown in FIG. 8A, the measurement circuit 80 is also a Wheatstone Bridge circuit and includes a first resistor 81, a second resistor 82, a third resistor 83 and a fourth resistor 84. The second resistor 82, the third resistor 83 and the fourth resistor 84 are adjacent and implement two of the first sensing resistors 74 and one of the second sensing resistors 75 in the thermal sensing device in FIG. 7A and FIG. 7B. Two of the first sensing resistors 74 in the thermal sensing device in FIG. 7A and FIG. 7B replace the second resistor 82 and the third resistor 83 in the Wheatstone Bridge circuit and the second sensing resistor 75 replaces the fourth resistor 84. The first resistor 81 and the second resistor 82 are connected in series between the voltage difference of the operating voltage Vb and the ground point. The third resistor 83 and the fourth resistor 84 are connected in series between the voltage difference of the operating voltage and the ground point and further connected in parallel with the first resistor 81 and the second resistor 82. Equations of the Wheatstone Bridge circuit as the measurement circuit 80 are:

$$Vs = V34 - V12, \quad V12 = Vb\left[\frac{R_2(T)}{R_1 + R_2(T)}\right], \quad V34 = Vb\left[\frac{R_4(T)}{R_3(T) + R_4(T)}\right]$$

Resistant values of the first resistor 81, the second resistor 82, the third resistor 83 and the fourth resistor 84 are $R_1$, $R_2(T)$, $R_3(T)$ and $R_4(T)$ respectively. The second resistor 82 and the third resistor 83 respectively include PTCR and the fourth resistor 84 includes NTCR. The resistant values of the second resistor 82 and the third resistor 83 become smaller and the resistant value of the fourth resistor 84 becomes larger as temperature drops when pressure is increased. The voltage values of the node voltage V12 between the first resistor 81 and the second resistor 82 is decreased and the voltages values of the node voltage V34 between the third resistor 83 and the fourth resistor 84 are increased. Therefore, the signal variation value Vs of the measurement circuit is substantially increased. Moreover, in a different embodiment, as shown in FIG. 8B, the first resistor 81 and the third resistor 83 include NTCR and the second resistor 82 includes PTCR. Alternatively, as shown in FIG. 8C, the first resistor 81 and the fourth resistor 84 include NTCR and the third resistor 83 includes PTCR or as shown in FIG. 8D, the first resistor 81 includes NTCR and the second resistor 82 and the third resistor 83 include PTCR. The signal variation value Vs is also greater than the signal variation value in the prior art.

Figure 9A:
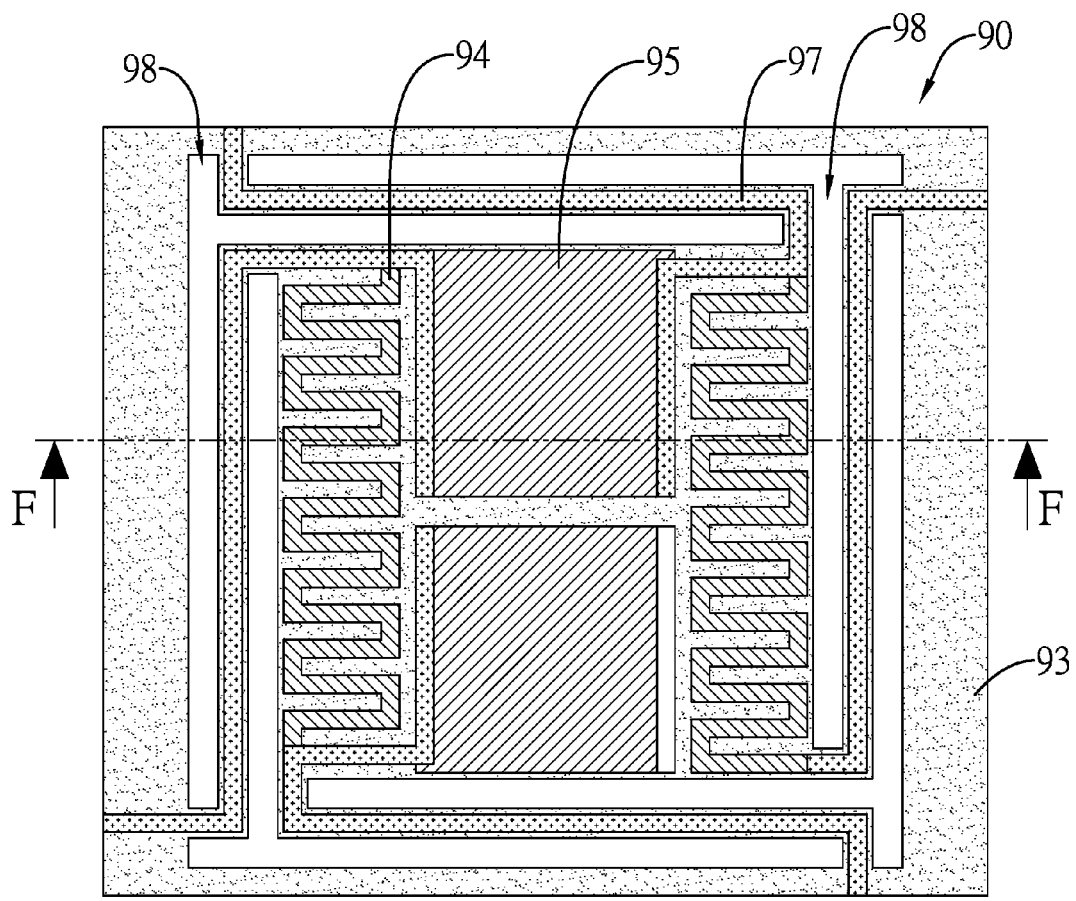
FIG. 9A is a schematic view of the thermal sensing device in a sixth embodiment of the present invention.
Figure 9B:
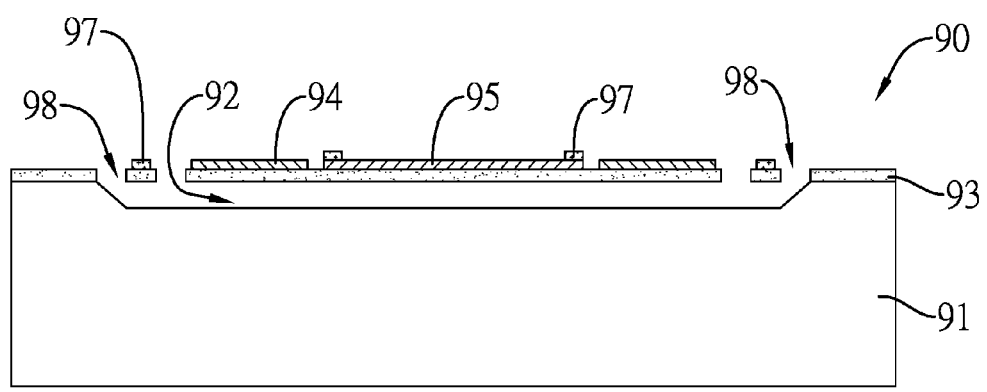
FIG. 9B is an F-F sectional view of FIG. 9A

FIG. 9A is a schematic view of the thermal sensing device in the sixth embodiment of the present invention. FIG. 9B is an F-F sectional view of FIG. 9A. As shown in FIG. 9A and FIG. 9B, the thermal sensing device 90 includes a substrate 91, a cavity 92, a first insulating layer 93, at least one first sensing resistor 94, at least one second sensing resistor 95, a plurality of electrical connecting wires 97 and a plurality of etching holes 98.

Figure 9C:
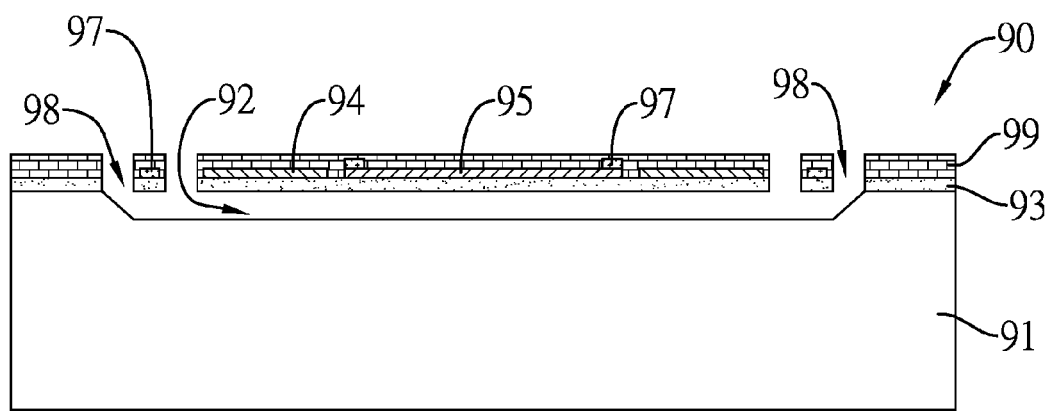
FIG. 9C is a sectional view of the thermal sensing device different from the thermal sensing device in FIG. 9B.

The first insulating layer 93 is disposed on the surface of the substrate 91. The at least one first sensing resistor 94 and the at least one second sensing resistor 95 are disposed on the surface of the first insulating layer 93. The at least one first sensing resistor 94 and the at least one second sensing resistor 95 are separated from each other. In the present embodiment, the number of the at least one first sensing resistor 94 is two and the number of the at least one second sensing resistor 95 is also two. Two of the second sensing resistors 95 are disposed between two of the first sensing resistors 94. The installation method and the installation positions of the rest components (such as the electrical connecting wires 97, the etching holes 98, the cavity 92 and so on) are the same as the fourth embodiment, and the description thereof is omitted herein. In a different embodiment, the thermal sensing device also includes a second insulating layer 99 and the second insulating layer 99 covers the top of the first insulating layer 93, the first sensing resistor 94, the second sensing resistor 95 and the electrical connecting wires 97, as shown in FIG. 9C. The cavity 92 below the first sensing resistor 94 and the second sensing resistor 95 is also implemented to minimize a thermal conductive path from the first sensing resistor 94 and the second sensing resistor 95 to the substrate 91.

Figure 10:
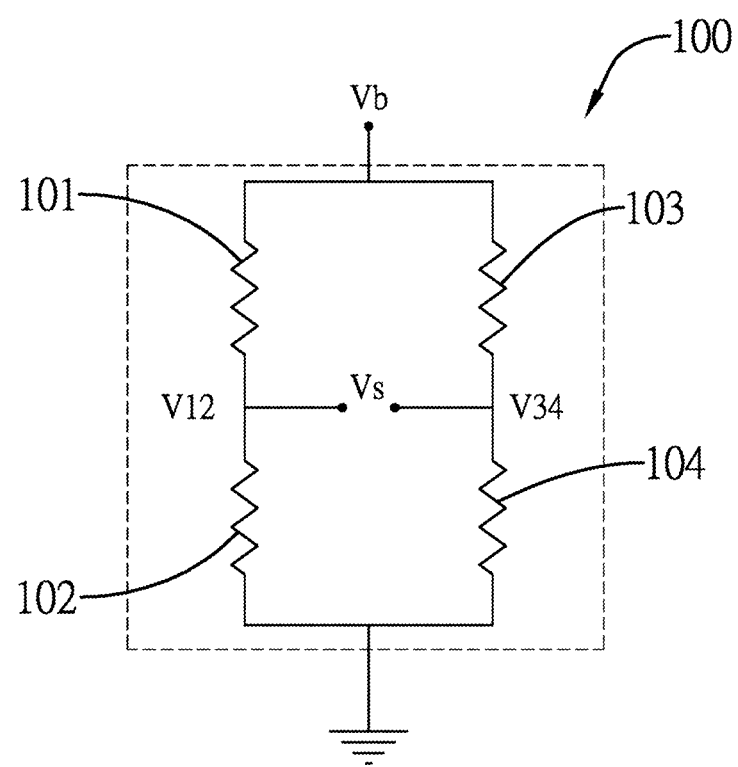
FIG. 10 is a measurement circuit diagram implemented in the thermal sensing device in the sixth embodiment in FIG. 9A and FIG. 9B.

FIG. 10 is a circuit diagram of the measurement circuits implemented in the thermal sensing device in the sixth embodiment in FIG. 9A and FIG. 9B. As shown in FIG. 10, the measurement circuit 100 is also a Wheatstone Bridge circuit and includes a first resistor 101, a second resistor 102, a third resistor 103 and a fourth resistor 104. The sensing resistors with the same temperature coefficient of resistance are oppositely jointed and the sensing resistors with different temperature coefficients of resistance are adjacently jointed. The first resistor 101, the second resistor 102, the third resistor 103 and the fourth resistor 104 in the Wheatstone Bridge circuit implement two of the at least one first sensing resistor 94 and two of the at least one second sensing resistor 95 in the thermal sensing device of the present invention in FIG. 9A and FIG. 9B. Two of the at least one sensing resistor 94 in FIG. 9A and FIG. 9B replace the second resistor 102 and the third resistor 103 in the Wheatstone Bridge circuit and the two of the at least one second sensing resistor 95 replace the first resistor 101 and the fourth resistor 104. The first resistor 101 and the second resistor 102 are connected in series between the voltage difference of the operating voltage Vb and the ground point. The third resistor 103 and the fourth resistor 104 are connected in series between the voltage difference of the operating voltage and the ground point and further connected in parallel with the first resistor 101 and the second resistor 102. Equations of the Wheatstone Bridge circuit as the measurement circuit 100 are:

$$Vs = V34 - V12, \quad V12 = Vb\left[\frac{R_2(T)}{R_1(T) + R_2(T)}\right], \quad V34 = Vb\left[\frac{R_4(T)}{R_3(T) + R_4(T)}\right]$$

Resistant values of the first resistor 101, the second resistor 102, the third resistor 103 and the fourth resistor 104 are $R_1(T)$, $R_2(T)$, $R_3(T)$ and $R_4(T)$ respectively. The first resistor 101 and the fourth resistor 104 include NTCR and the second resistor 102 and the third resistor 103 include NTCR. The resistant values of the second resistor 102 and the third resistor 103 become smaller and the resistant values of the first resistor 101 and the fourth resistor 104 become larger as temperature drops when pressure is increased. The voltage value of the node voltage V12 between the first resistor 101 and the second resistor 102 is decreased and the voltage value of the node voltage V34 between the third resistor 103 and the fourth resistor 104 is increased. Therefore, the signal variation value Vs of the measurement circuit is substantially increased. The signal variation value at the present embodiment is greater than the signal variation value in the prior art.

Figure 11A:
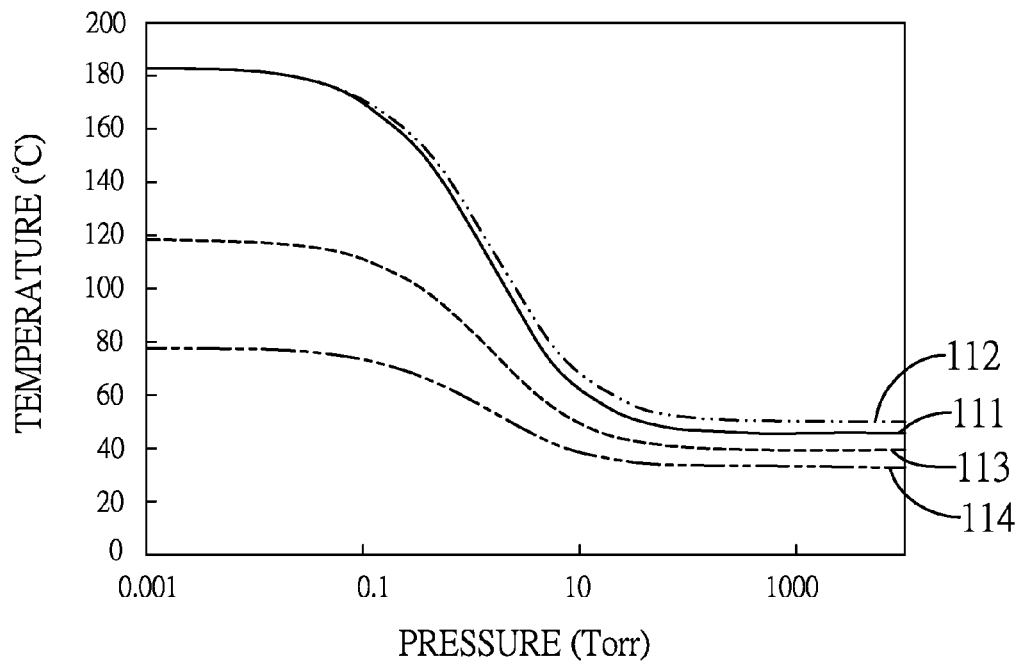
FIG. 11A is a curve diagram of a temperature and pressure variation when the measurement circuit in the present invention implements two, three or four sensing elements and the measurement circuit in the prior art implements one sensing element.
Figure 11B:
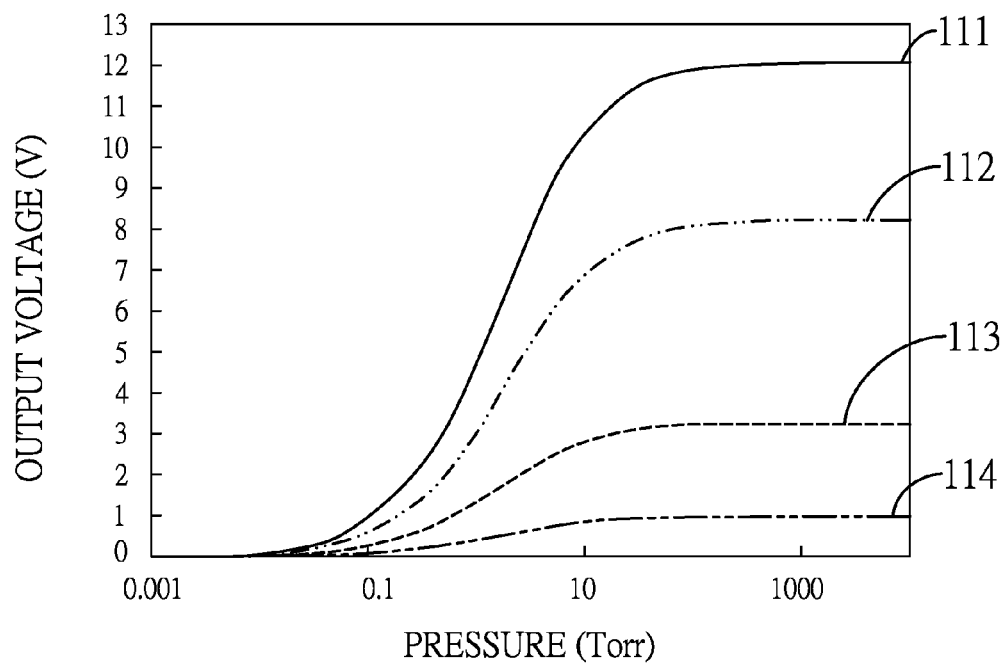
FIG. 11B is a characteristic curve diagram of a comparison of the output voltage when the measurement circuit in the present invention implements two, three or four sensing elements and the measurement circuit in the prior art implements one sensing element.
Figure 12:
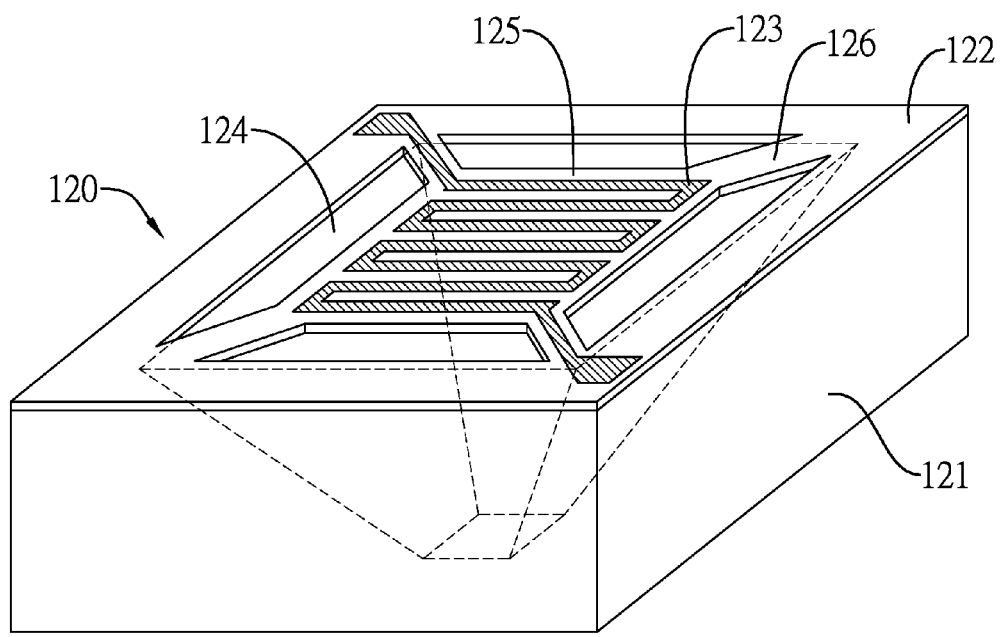
FIG. 12 illustrates a conventional thermal sensing device.
Figure 13:
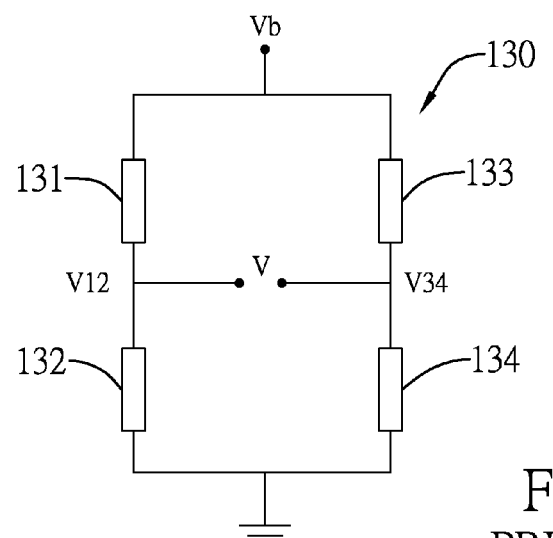
FIG. 13 is a circuit diagram of a Wheatstone Bridge circuit implementing a sensing element in the prior art.

FIG. 11A is a temperature and pressure variation curve diagram of the measurement circuit in the present invention implementing two sensing resistors, three sensing resistors and four sensing resistors and the measure circuit in the prior art implementing one sensing resistor. As shown in FIG. 11A, when the pressure is increased, the temperature and pressure variation in a characteristic curve 111 of the four sensing resistors, a characteristic curve 112 of the three sensing resistors, a characteristic curve 113 of the two sensing resistors is greater than the temperature and pressure variation in a characteristic curve 114 of the one sensing resistor in the prior art. The temperature variation being large represents the signal variation value Vs is also large. As shown in FIG. 11B, the characteristic curve 111 for four sensing resistors, the characteristic curve 112 for three sensing resistors, the characteristic curve 113 for two sensing resistors and the characteristic curve 114 for one sensing resistor in the prior art represent that the variations of the output voltages in the present invention with four sensing resistors, three sensing resistors and two sensing resistors is greater than the variation of the output voltage in the prior art with one sensing resistor. Therefore, the problem that the signal becomes smaller when the sensing element is minimized may be improved.

By increasing the number of the sensing resistors in one thermal sensing device and adapting to the installation locations of the resistors in the Wheatstone Bridge measurement circuit, the sensing signal is significantly increased so as to resolve the problem that the signal becomes smaller when the sensing element is minimized.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A thermal sensing device, comprising:
    a substrate;
    a first insulating layer disposed on the substrate;
    at least one first sensing resistor disposed above the first insulating layer;
    at least one second sensing resistor disposed above the first insulating layer;
    a plurality of etching holes disposed around the at least one first sensing resistor and the at least one second sensing resistor;
    a cavity formed below the at least one first sensing resistor and the at least one second sensing resistor;
    wherein the thermal sensing device is implemented in a measurement circuit, the measurement circuit includes a first resistor, a second resistor, a third resistor, and a fourth resistor, and the at least one first sensing resistor and the at least one second sensing resistor are respectively implemented to be at least two of the first resistor, the second resistor, the third resistor, and the fourth resistor of the measurement circuit.

2. The thermal sensing device as claimed in claim 1, further comprising:
    a second insulating layer covering a portion of the first insulating layer, the at least one first sensing resistor, and the at least one second sensing resistor.

3. The thermal sensing device as claimed in claim 1, further comprising:
    a plurality of electrical connecting wires disposed on the first insulating layer and configured to electrically connect the at least one first sensing resistor and the at least one second sensing resistor with an external circuit.

4. The thermal sensing device as claimed in claim 1, further comprising:
    a third insulating layer covering the at least one first sensing resistor and a portion of the first insulating layer.

5. The thermal sensing device as claimed in claim 1, wherein the measurement circuit is a Wheatstone Bridge circuit, and the first resistor and the second resistor of the measurement circuit are connected in series between a voltage difference of an operating voltage and a ground point, and the third resistor and the fourth resistor are connected in series between the voltage difference of the operating voltage and the ground point, and the first resistor and the second resistor in series are further connected in parallel with the third resistor and the fourth resistor in series.

6. The thermal sensing device as claimed in claim 5, wherein both the quantities of the at least one first sensing resistor and the at least one second sensing resistor are one, and both of the at least one first sensing resistor and the at least one second sensing resistor have positive temperature coefficient of resistance and are implemented respectively to be the second resistor and the third resistor or respectively to be the first resistor and the fourth resistor in the measurement circuit.

7. The thermal sensing device as claimed in claim 5, wherein both the quantities of the at least one first sensing resistor and the at least one second sensing resistor are one, and both of the at least one first sensing resistor and the at least one second sensing resistor have negative temperature coefficient of resistance and are implemented respectively to be the second resistor and the third resistor or respectively to be the first resistor and the fourth resistor in the measurement circuit.

8. The thermal sensing device as claimed in claim 5, wherein both the quantities of the at least one first sensing resistor and the at least one second sensing resistor are one, one of the at least one first sensing resistor and the at least one second sensing resistor has positive temperature coefficient of resistance and the other one of the at least one first sensing resistor and the at least one second sensing resistor has negative temperature coefficient of resistance, and the at least one first sensing resistor and the at least one second sensing resistor are implemented respectively to be the third resistor and the fourth resistor, respectively to be the third resistor and the first resistor, respectively to be the second resistor and the first resistor, or respectively to be the second resistor and fourth resistor in the measurement circuit.

9. The thermal sensing device as claimed in claim 5, wherein the at least one first sensing resistor and the at least one second sensing resistor respectively have positive temperature coefficient of resistance and negative temperature coefficient of resistance, the number of the at least one first sensing resistor is two and the number of the at least one second sensing resistor is one, and the at least one first sensing resistor is implemented to be the second resistor and the third resistor of the measurement circuit and the at least one second sensing resistor is implemented to be the first resistor or the fourth resistor of the measurement circuit, or the at least one first sensing resistors are implemented to be the first resistor and the fourth resistor of the measurement circuit and the at least one second sensing resistor is implemented to be the second resistor or the third resistor of the measurement circuit.

10. The thermal sensing device as claimed in claim 5, wherein the at least one first sensing resistor and the at least one second sensing resistor respectively have positive temperature coefficient of resistance and negative temperature coefficient of resistance, the number of the at least one first sensing resistor is one and the number of the at least one second sensing resistor is two, and the at least one first sensing resistor is implemented to be the second resistor or the third resistor of the measurement circuit and the at least one second sensing resistor is implemented to be the first resistor and the fourth resistor of the measurement circuit, or the at least one first sensing resistor is implemented to be the first resistor or the fourth resistor of the measurement circuit and the at least one second sensing resistor is implemented to be the second resistor and the third resistor of the measurement circuit.

11. The thermal sensing device as claimed in claim 5, wherein the at least one first sensing resistor and the at least one second sensing resistor respectively have positive temperature coefficient of resistance and negative temperature coefficient of resistance, the number of the at least one first sensing resistor is two and the number of the at least one second sensing resistor is two, and the at least one first sensing resistor is implemented to be the second resistor and the third resistor of the measurement circuit and the at least one second sensing resistor is implemented to be the first resistor and the fourth resistor of the measurement circuit, or the at least one first sensing resistors are implemented to be the first resistor and the fourth resistor of the measurement circuit and the at least one second sensing resistors are implemented to be the second resistor and the third resistor of the measurement circuit.

\* \* \* \* \*